(No Model.)
F. W. STARR.
FASTENING DEVICE.
No. 419,375. Patented Jan. 14, 1890.
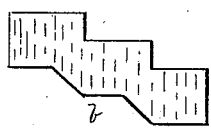
Fig 1.
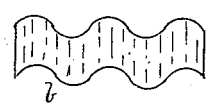
Fig 2.
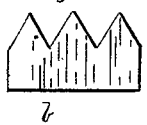
Fig 3.
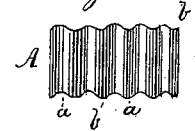
Fig 4.
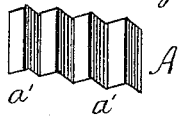
Fig 5.
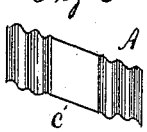
Fig 5a.
Fig 6.
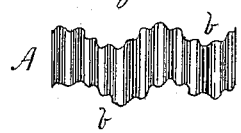
Fig 7.
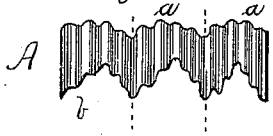
Fig 8.
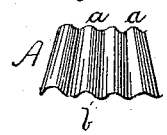
Fig 9.
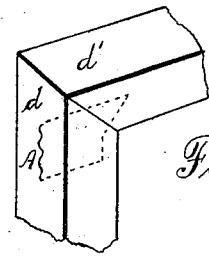
Fig 10.
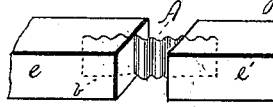
Fig 11. Fig 11a. Fig 11b.
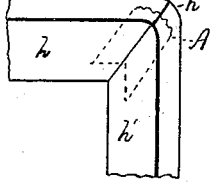
Fig 12.
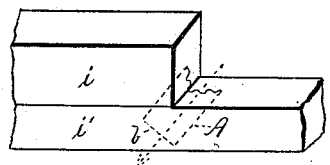
Fig 13.
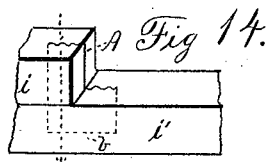
Fig 14.
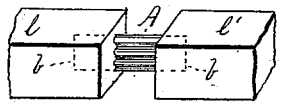
Fig 15.
Fig 16.
Fig 16a.
Witnesses
W. M. King.
A. H. Stamp.
Inventor
Ferdinand W. Starr.
By his Attorney
C. C. Swett.

UNITED STATES PATENT OFFICE.

FERDINAND W. STARR, OF SPRINGFIELD, OHIO.

FASTENING DEVICE.

SPECIFICATION forming part of Letters Patent No. 419,375, dated January 14, 1890.

Application filed September 5, 1888. Serial No. 284,652. (No model.)

*To all whom it may concern:*

Be it known that I, FERDINAND W. STARR, a citizen of the United States, residing at Springfield, in the county of Clark and State of Ohio, have invented certain new and useful Improvements in Fastening Devices; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention consists in a fastening device for securing together or for connecting at definite distances from each other pieces of wood and similar substances. It is susceptible of many applications, a few of which are shown in the accompanying drawings and described in this specification.

In the drawings, Figures 1, 2, and 3 are side views of three forms of blanks having irregular edges from which fasteners are made.
Fig. 4 is a perspective view of a fastener made from a right-angled blank having straight edges. Figs. 5 and $5^a$ are perspective views of fasteners made from right-angled blanks. Fig. 6 is a perspective view of a strip or series of undivided fasteners made from blank in Fig. 1. Figs. 7 and 8 are perspective views of strips of undivided fasteners made from blank in Fig. 2. Fig. 9 is a perspective view of a finished fastener described hereinafter. Figs. 10, 11, $11^a$, 12, 13, and 14 are perspective views showing a few of the uses to which the invention may be applied. Fig. $11^b$ is an edge view of the device in one of its uses. Fig. 15 is a perspective view showing the application of a fastener having both ends sharpened, and Figs. 16 and $16^a$ are vertical edge views of the fasteners in section.

The different parts of the invention are referred to by letters, similar letters denoting corresponding parts in the different views.

The fastener A is formed from sheet metal cut into blanks of various forms and having one or both edges straight or irregular, being either notched, curved, or scalloped, and having one edge $b$ or both opposite edges $b\ b$ sharpened to form entering edges. Where the entering edge is irregular, it must be sharpened throughout and not merely at the point, for then the sharp point would readily enter the wood, but the dull part would only tear and crush its way in, leaving the surface edge of the wood ragged and rough, but being sharpened up to each extremity of the notch the fastener enters by a kind of "draw cut," passing through the grain and knots. These sharpened blanks are bent into a zigzag shape, forming transverse corrugations, (shown to be rounded $a\ a$ in Figs. 6, 7, and 8, or angular $a'\ a'$ in Fig. 5.) The strips are then cut into desired lengths and are ready for use as fasteners.

Figs. 10, 11, $11^a$, $11^b$, 12, 13, 14, and 15 represent pieces of wood to which the fasteners are applied, illustrating a few of the possible uses to which they may be put.

Fig. 10 represents any obtuse-angled joint formed by the pieces $d\ d'$ and fastened together by my device. The fastener in this case is cut from the strip in Fig. 6 on the dotted lines, and the outline of the fastener within the wood is indicated by dotted lines. So in Fig. 12 is shown the use of a fastener cut on the dotted line from the strip in Fig. 8.

Fig. 12 illustrates my method of securing the corner-joints of a picture or slate frame, or any article having sides, as $h\ h'$, to be joined together.

Fig. 13 shows how my fastener secures together two pieces of wood, as $i\ i'$. In this case the entering edge is regular, while the driving-edge has a single angular notch, the dotted arrow showing the direction in which the fastener is driven; and Fig. 14 shows the use of still another form of the driving-edge of the fastener in securing together the pieces $i\ i'$, the dotted arrow showing the direction taken by the fastener.

In Figs. 10, 12, 13, and 14 the conformation of the driving-edge of the fastener to the contiguous surface of the wood is shown, a thin zigzag line of metal only being visible on the outside, while within the wide corrugated body of the fastener is tightly interlocked with the fiber of the wood.

Fig. $5^a$ shows a form of the invention in which a portion $c$ is left uncorrugated. This form is used to connect two pieces, as $f\ f'$, in Fig. $11^a$, leaving the plain portion $c$ between the said pieces or to connect parallel pieces, as $g$ $g'$, in Fig. 11$^b$, the fastener being bent into a curve either before or after it is driven in.

Fig. 5 shows a fastener with angular corrugations $a'$ $a'$, at fixed distances apart, which serve as a scale in determining the distance at which a piece $e$ shall be joined to the piece $e'$, as in Fig. 11.

In Fig. 9 the corrugations $a$ $a$ are made to diverge slightly toward the entering edge $b$. The effect of this form is to force the parts brought together into a closer contact and to make its withdrawal more difficult than if the corrugations were parallel.

Fig. 15 shows the use of a fastener having both edges sharpened. In applying this form the fastener is placed against a fixed piece, as $l$, and the piece $l'$ to be joined to it is forced against the fastener, which enters both pieces at once.

I am aware that strips of metal are driven into the "end grain" of wood as fasteners, depending on the angular bending of the metal and on "teeth" to give them a hold in the wood; but they cannot be used for the purpose my fastener is intended to serve, as the teeth fail to enter hard wood or across the grain and collapse when driven against it.

In my invention the body ridges or corrugations are formed with the view of rendering the entire fastener inflexible even to the point or edge, so that it is easily driven into hard wood and will go directly or obliquely through or across the grain of the wood.

Having now described my invention, what I claim, and desire to secure, is—

A fastening device formed from sheet metal having irregular edges, transverse corrugations, and a sharpened entering edge, as herein described.

In testimony whereof I affix my signature in presence of two witnesses.

FERDINAND W. STARR.

Witnesses:
F. A. DOSSMANN,
FRANK DUNN.